United States Patent [19]
Uryu et al.

[11] Patent Number: 5,590,212
[45] Date of Patent: Dec. 31, 1996

[54] DIAPHRAGM FOR A CAPACITANCE TYPE LOUDSPEAKER

[75] Inventors: Masaru Uryu, Chiba; Kunihiko Tokura, Saitama; Ikuo Chatani, Kanagawa; Ikuo Mizoguchi; Mamoru Ito, both of Tochigi, all of Japan

[73] Assignee: Sony Corporation, Tokyo, Japan

[21] Appl. No.: 281,633

[22] Filed: Jul. 28, 1994

[30] Foreign Application Priority Data

Jul. 30, 1993 [JP] Japan .................................. 5-190147

[51] Int. Cl.⁶ .................................................. H04R 25/00
[52] U.S. Cl. ............................ 381/191; 381/113; 381/174
[58] Field of Search ................................... 381/191, 174, 381/173, 113, 116, 202, 190; 181/167, 168, 170; 310/324, 311, 45, 13

[56] References Cited

U.S. PATENT DOCUMENTS 5,206,914  4/1993  Fortney et al. .......................... 381/191
5,392,358  2/1995  Driver ...................................... 381/191

Primary Examiner—Curtis Kuntz
Assistant Examiner—Vivian Chang
Attorney, Agent, or Firm—Hill, Steadman & Simpson

[57] ABSTRACT

A diaphragm for capacitance type loudspeaker is disclosed. The diaphragm uses a conductive high polymer layer as a conductor formed on a high molecular film of PET or the like by treating the high molecular film in a water solvent solution containing a conductive high molecular monomer, a chemical oxidizer and a dopant. The conductive high molecular monomer is selected from the group consisting of pyrrole, aniline, thiophene and derivatives thereof.

8 Claims, 3 Drawing Sheets

DIAPHRAGM FOR A CAPACITANCE TYPE LOUDSPEAKER

BACKGROUND

1. Field of the Invention

The present invention relates to a diaphragm employed in a capacitance type loudspeaker. More particularly, the present invention relates to a diaphragm for a capacitance type loudspeaker using a high molecular film.

2. Background of the Invention

A capacitance type loudspeaker has a conductive film-like diaphragm provided between two fixed electrodes. The capacitance type loudspeaker utilizes the following sounding mechanism. A DC high voltage is applied as a bias between the film-like diaphragm and the fixed electrodes to form a strong electric field, and an AC electric field by an audio signal voltage is added to be superposed thereon, thus generating an electrostatic vibratory force to the diaphragm. This vibratory force causes the diaphragm to vibrate and hence generate sounds.

Consequently, as is apparent from the above-described structure and sounding mechanism, the property and conductivity of the diaphragm are critical for satisfactory performance. Therefore, it has been a conventional practice to vapor-deposit a metal, such as aluminum, or apply a surface active agent used for electrostatic prevention, onto the high molecular film for providing optimum conductivity to the diaphragm.

However, the conventional practice accompanies the following inconvenience.

First, in the capacitance type loudspeaker, the vibratory force F generated to the diaphragm is expressed by $F \propto eQ/d_1+d_2$, with $e$ denoting the audio signal voltage, Q denoting the charge of the diaphragm, and $d_1$, $d_2$ denoting the cavities between the diaphragm and the fixed electrodes. Practically, the required charge Q of the diaphragm is provided by applying a bias voltage $E$ between the diaphragm and the fixed electrodes through a high resistance $R_0$.

It is necessary that the minimum value of resistance $R_0$ at this point is a constant when it satisfies $R_0C_0 > \frac{1}{2}f_0$ with $f_0$ denoting the lowest frequency of the loudspeaker and $C_0$ denoting the capacitance between the fixed electrodes and the diaphragm. For instance, $R_0 > 40$ MΩ is preferred under the conditions of $f_0 = 25$ Hz, $C_0 = 500$ pF.

Accordingly, if a conductor of the diaphragm is a good conductive material having a metal, such as aluminum, vapor-deposited thereon, a high resistor of $R_0 > 40$ MΩ is required. Since a practically used capacitance type loudspeaker requires a bias voltage $E$ of approximately 5000 V, a high resistor which can be safe at such a high voltage needs to be large. In addition, the resistor charged with a high voltage is extremely hazardous.

Meanwhile, the Japanese Patent Examined (KOKOKU) Publication No. 41-18646 (JP-B-41 18646) discloses a technique of achieving high resistance of the conductive layer of the diaphragm by applying a high resistance conductive material, such as a surface active agent for electrostatic prevention, onto the high molecular film, without requiring the high resistor in the good conductor.

However, the surface active agent has conductivity which is likely to be affected by ambient humidity, and has surface resistivity greatly changed by approximately 102 to 104 times.

In view of the above status of the art, forming a conductive high molecular membrane on the high molecular film surface is considered.

As a method of forming the conductive high polymer on the high molecular film surface, the Japanese Laid-Open (KOKAI) Patent Publication No. 63-20361 (JP-A-63 20361) proposes a method of forming a polymer layer by applying a solution of high molecular resin as a binder material containing a chemical oxidizer or a conductive high molecular monomer, then soaking the former in a solution containing the conductive high molecular monomer or exposing the former into a vapor of the conductive high molecular monomer, and soaking the latter in a solution containing the chemical oxidizer.

However, the above method requires an advanced technique of applying the thin membrane on the high molecular film. It also has a problem such that the high molecular resin used as the binder greatly changes the property of the high molecular film.

The above-described techniques leave the problems unsolved, such as the need of a high resistor, the effect of the ambient humidity and the effect on the property of the high molecular film forming the diaphragm. Solutions to these problems are now required.

SUMMARY OF THE INVENTION

It is therefore an object of the present invention to provide a diaphragm for capacitance type loudspeaker which resolves the above-mentioned problems.

According to the present invention, there is provided a diaphragm for capacitance type loudspeaker. The diaphragm employs a conductive high polymer layer as a conductor formed on a high molecular film by treating the high molecular film in a water solvent solution containing a conductive high molecular monomer, a chemical oxidizer and a dopant.

According to the present invention, it is possible to provide a diaphragm for capacitance type loudspeaker which has optimum surface resistivity without having a separate high resistor and is rarely affected by humidity. Also, according to the present invention, since the property of the high molecular film as a base of the diaphragm can be maintained, it is possible to provide a diaphragm for capacitance type loudspeaker which is satisfactory in acoustic property.

DESCRIPTION OF THE INVENTION

The diaphragm for capacitance type loudspeaker of the present invention will now be described with reference to the accompanying drawings.

[Structure of Capacitance Type Loudspeaker]

Figure 1:
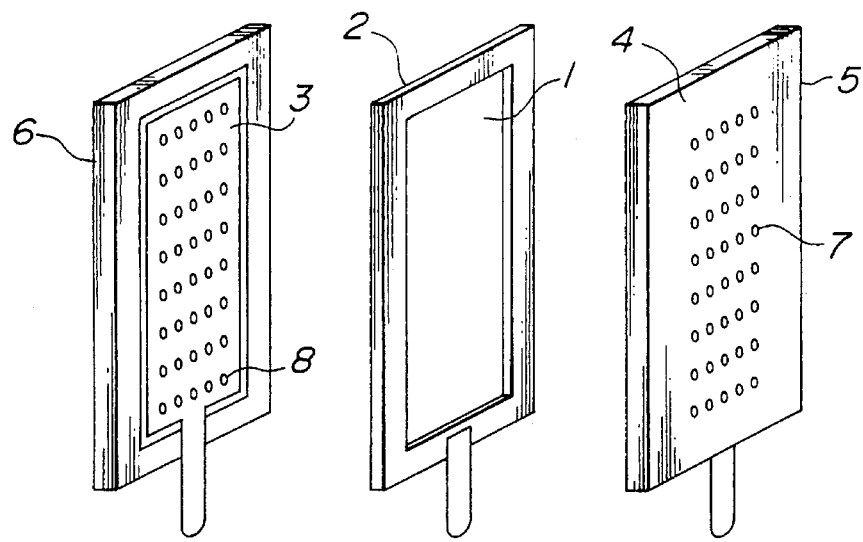
FIG. 1 is an exploded perspective view showing an example of the structure of the capacitance type loudspeaker.

The capacitance type loudspeaker of the present invention has a diaphragm 1 stretched in a diaphragm fixing frame 2 and retained at predetermined distances $d_1$, $d_2$ between fixed electrodes 3, 4, as shown in FIG. 1. The fixed electrodes 3, 4 have a number of acoustic radiation holes 7, 8 and are fixed in insulator frames 5, 6, respectively.

Figure 2:
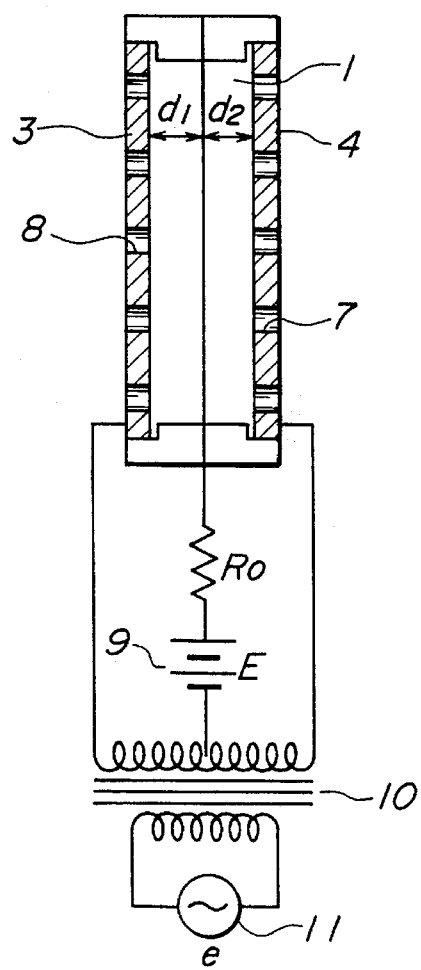
FIG. 2 is a circuit diagram showing the structure of a driving circuit of the capacitance type loudspeaker.

The diaphragm 1 is connected with a DC high voltage power source 9 via a resistor $R_0$, as shown in FIG. 2. By applying a DC high voltage, an electric charge is stored substantially on the entire surface of the diaphragm 1 through a high resistance coat, that is, a conductive high polymer layer. The capacitance type loudspeaker of the present invention does not require a separate resistor $R_0$ since the conductive high polymer layer has high resistivity.

The fixed electrodes 3, 4 are connected with an AC power source 11 via a transformer 10. A signal alternating voltage is applied in superposition on the DC high voltage, thus providing an electrostatic vibratory force to the diaphragm 1.

The diaphragm 1 employs as a conductor a conductive high polymer layer formed on a high molecular film by treating the high molecular film in a water solvent solution containing a conductive high molecular monomer, a chemical oxidizer and a dopant.

The conductive high molecular monomer is exemplified by pyrrole or its derivative, aniline or its derivative, and thiophene or its derivative. Pyrrole or its derivative is exemplified by N-alkylpyrrole, N-arylpyrrole, 3-alkylpyrrole, 3-halogenated pyrrole, 3,4-dialkylpyrrole, and 3,4-dihalogenated pyrrole. It is preferred that the number of atoms of the alkyl group is 1 to 4, and that the halogen atom is a chlorine atom. Aniline or its derivative is exemplified by o-methylaniline, m-methylaniline, N-methylaniline, N-ethylaniline, N-dimethylaniline, N-diethylaniline, chloroaniline, dichloroaniline, chloro-N-dimethylaniline, dichloro-N-acetylaniline, N-butylaniline, N-phenylaniline, o-toluidine, m-toluidine, o-anisidine, m-anisidine, o-chloroaniline, and m-chloroaniline. Thiophene or its derivative is exemplified by 3-methylthiophene and 3-methoxythiophene.

The chemical oxidizer is exemplified by ammonium persulfate, sodium persulfate, potassium persulfate, hydrogen peroxide, sodium hypochlorite, potassium hypochlorite, sodium chlorate, potassium chlorate, ferric chloride, ferric perchlorate, and ferric sulfate.

The dopant is exemplified by halogen group, such as, chlorine, bromine and iodine, Lewis acid, such as phosphorus pentafluoride, hydrochloric acid, sulfuric acid, p-toluenesulfonic acid, salicylic acid, 1,5-naphthalenesulfonic acid, acetic acid, protonic acid, such as benzoic acid, and soluble salt of these. The chemical oxidizer may serve as the dopant in some cases.

The high molecular film as the base of the diaphragm 1 may be of polyester, such as polyethylene terephthalate, polystyrene, polypropylene, polyetherimide, polyvinylidene chloride, polyvinyl fluoride, or other insulating polymeric materials. The material and thickness of the high molecular film is selected in accordance with the property and acoustic quality of the capacitance type loudspeaker to be designed.

The conductive high polymer layer can be easily formed on the high molecular film by treating the high molecular film in a water solvent solution containing the above-mentioned conductive high molecular monomer, chemical oxidizer and dopant. It is preferred to adjust the surface resistivity of the conductive high polymer layer measured by the JIS (Japanese Industrial Standard) method to $1 \times 10^4$ to $1 \times 10^{10}$ $\Omega/\square$ by adjusting the density of the dopant.

By adjusting the surface resistivity of the conductive high polymer layer to not lower than $\times 10^4$ $\Omega/\square$, it is possible to achieve high resistivity of the conductor without having the resistor $R_0$ or with reduced resistance. However, if the surface resistivity exceeds $1 \times 10^{10}$ $\Omega/\square$, the conductive high polymer layer partially suffers conductivity failure and is not capable of exhibiting stable property.

With a conductor formed by vapor-depositing a metal, it is difficult to adjust the surface resistivity to $1 \times 10^4$ to $1 \times 10^{10}$ $\Omega/\square$, and therefore partial conductivity failure occurs. In the present invention, however, it is possible to arbitrarily control the surface resistivity of the conductive high polymer layer by setting suitable manufacture conditions.

It is required that the diaphragm of the capacitance type loudspeaker be lightweight, that is, made of a thin film. A film having a thickness of 25 μm or less, for instance, a film 6 μm in thickness, is generally used. The thickness of the conductive high polymer layer occupying an excessively large portion of the thickness of the film may affect the property of the high molecular film.

Consequently, in the present invention, it is preferred to set the thickness of the conductive high polymer layer to 0.04 to 5% of the thickness of the high molecular film.

It is normally possible to adjust the thickness of the conductive high polymer layer formed by treatment in the water solvent solution, to be extremely thin, such as 0.01 to 0.05 μm.

In this case, the rate of the thickness of the conductive high polymer layer is approximately 0.04 to 0.2% of a 25-μm-thick film, or approximately 0.16 to 0.8% of a 6-μm-thick film, which rarely affects the property of the high molecular film.

On the contrary, the thickness of the above-mentioned conductive layer of the application conducting type is affected by the application technique. A thickness of 2 μm or greater is required to maintain stable application state of the layer and conductivity. In this case, the rate of the thickness of the conductive layer is approximately 8% of a 25-μm-thick film, or approximately 30% of a 6-μm-thick film, which significantly affects the property of the high molecular film.

EXAMPLE 1

A polyester or PET film 6 μm in thickness was soaked for one hour in a solution containing 0.2 mol/kg of pyrrole monomer and 0.2 mol/kg of ferric chloride serving as the chemical oxidizer and the dopant. The film was then washed with water and dried, to form a film having surface resistance of $1 \times 10^7$ to $3 \times 10^7$ $\Omega/\square$.

The longitudinal wave propagation velocity of the resulting film was measured. As shown in Table 1, the longitudinal wave propagation velocity differed little from that of an unprocessed film, exhibiting no effect on the property due to the formation of the conductive high polymer layer.

TABLE 1

|  | Longitudinal Wave Propagation Velocity (m/sec) |
| --- | --- |
| Processed Film | 2070 |
| Unprocessed Film | 2030 |

EXAMPLE 2

A polyetherimide film 8 μm in thickness was soaked for three hours in a solution containing as the dopant 1% by weight of p-toluenesulfonic acid, 0.01 mol/kg of pyrrole monomer and 0.0125 mol/kg of ammonium persulfate. The film was then washed with water and dried, to form a film having surface resistivity of $3 \times 10^5$ to $5 \times 10^5$ Ω/□.

Changes in surface resistivity due to humidity of the films produced in Examples 1 and 2 were investigated. The result is shown in FIG. 3, along with the measurement result of a comparative example using a nonionic surface active agent, Chemistat 2500 (trade name) produced by Sanyo Kasei.

Figure 3:
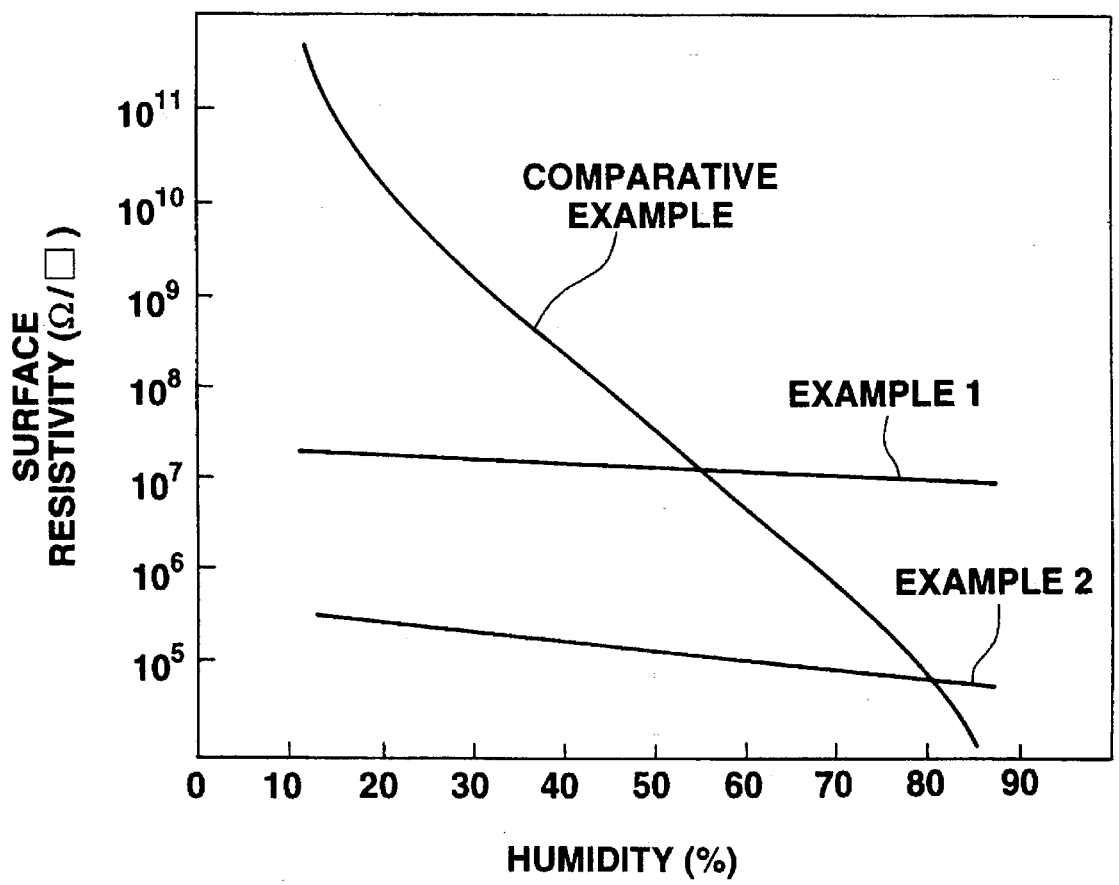
FIG. 3 is a graph showing changes due to humidity in surface resistivity of the diaphragm having a conductive high polymer layer as a conductor in comparison with the those of a diaphragm having a surface active agent as a conductor.

As is apparent from FIG. 3, the surface resistivity of the conductive layer using the surface active agent is greatly affected by the humidity, while the surface resistivity of the conductive layers (conductive high polymer layers) of Examples 1 and 2 is constant and is not affected by the ambient humidity.

Figure 4:
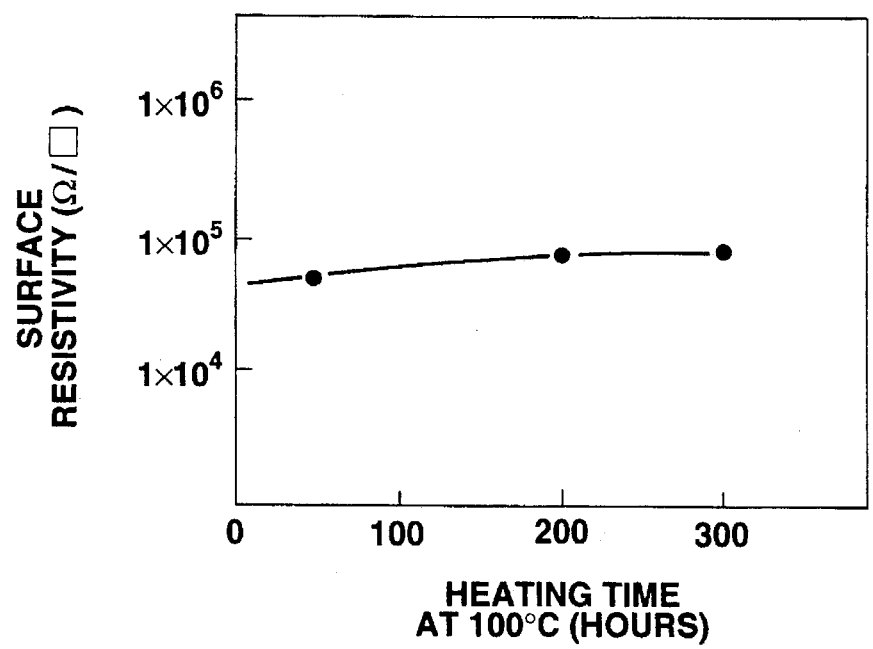
FIG. 4 is a graph showing changes due to heat in surface resistivity of the diaphragm having the high polymer layer as the conductor.
Figure 5:
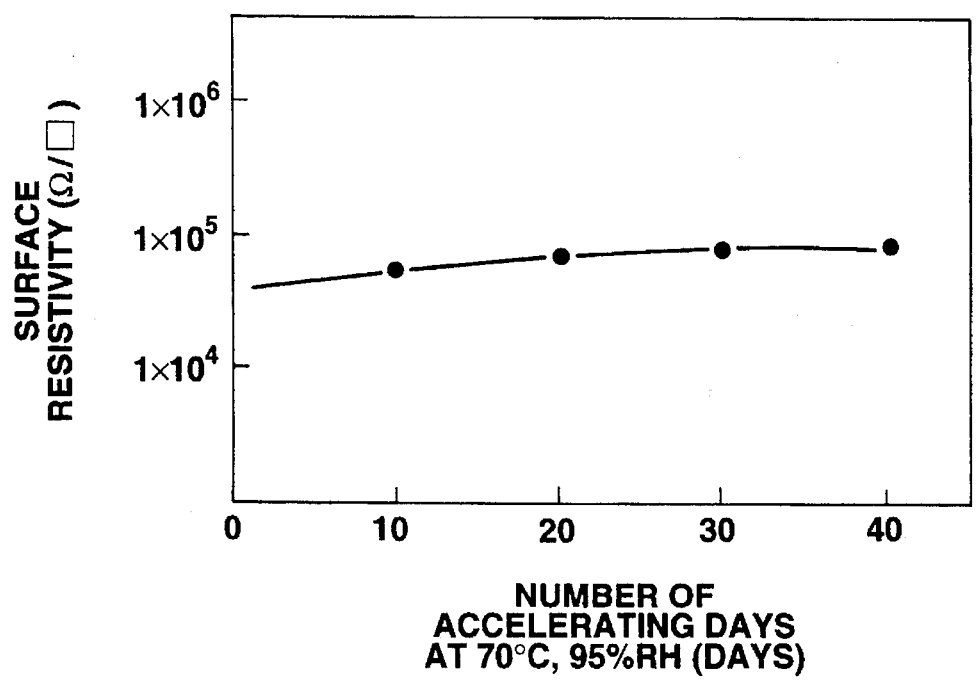
FIG. 5 is a graph showing changes in surface resistivity in case where the diaphragm having the high polymer layer as the conductor is stored at high temperatures and high humidity.

In addition, heat resistance of surface resistivity, that is, changes in surface resistivity due to heating time at 100° C., and heat/humidity resistance of surface resistivity, that is, changes in surface resistivity due to the number of accelerating days in storage at a temperature of 70° C. and relative humidity of 95%, of the film of Example 2 were investigated. As shown in FIGS. 4 and 5, the surface resistivity exhibited highly stable behavior.

Furthermore, the capacitance type loudspeaker shown in FIGS. 1 and 2 was experimentally produced using the films of Examples 1 and 2. The resulting capacitance type loudspeaker exhibited highly stable behavior.

EXAMPLE 3

A polyester or PET film 6 μm in thickness was soaked for two hours in a solution containing 0.1 mol/kg of aniline monomer, 0.05 mol/kg of ammonium persulfate and 0.1 mol/kg of hydrochloric acid. The film was then washed with water and dried, to form a film having surface resistivity of $1 \times 10^5$ to $5 \times 10^5$ Ω/□. As a loudspeaker was experimentally produced using the resulting film in a manner similar to Example 1, it exhibited stable behavior.

EXAMPLE 4

A polyester or PET film 6 μm in thickness was soaked for two hours in a solution containing 0.3 mol/kg of thiophene monomer and 0.5 mol/kg of ferric chloride. The film was then washed with water and dried, to form a film having surface resistivity of $1 \times 10^7$ to $5 \times 10^7$ Ω/□. As a loudspeaker was experimentally produced using the resulting film in a manner similar to Example 1, it exhibited stable behavior.

What is claimed is:

1. A diaphragm for a capacitance type loudspeaker comprising:

a base film having a thickness of 25 μm or less, and a conductive polymer layer disposed on said base film, the conductive polymer layer having a thickness of from about 0.04% to about 5% of the base film thickness and having a surface resistivity of from about $1 \times 10^4$ to about $1 \times 10^{10}$ ohms per square, and being formed by soaking the base film in an aqueous solution comprising a conductive high molecular monomer, a chemical oxidizer and a dopant in the absence of a resin binder.

2. A diaphragm as defined in claim 1, wherein the conductive high molecular monomer is selected from the group consisting of pyrrole, aniline, thiophene and derivatives of any of the foregoing.

3. A diaphragm as defined in claim 1, wherein the conductive polymer layer comprises a conductive high molecular monomer and a halogen-containing chemical oxidizer.

4. A diaphragm as defined in claim 1, wherein the base film is an insulating polymeric material.

5. A diaphragm as defined in claim 1, wherein the base film is selected from the group consisting of: polyester, polystyrene, polypropylene, polyetherimide, polyvinylidene chloride and polyvinyl fluoride.

6. A diaphragm as defined in claim 1, wherein the chemical oxidizer is selected from the group consisting of ammonium persulfate, sodium persulfate, potassium persulfate, hydrogen peroxide, sodium hypochlorite, potassium hypochlorite, sodium chlorate, potassium chlorate, ferric chloride, ferric perchlorate and ferric sulfate.

7. A diaphragm as defined in claim 1, wherein the dopant is selected from the group consisting of halogens, Lewis Acids, hydrochloric acid, sulfuric acid, p-toluenesulfonic acid, salicyclic acid, 1,5-naphthalenesulfonic acid, acetic acid, protonic acids and water soluble salts of any of the foregoing.

8. A method for making a diaphragm for a capacitance type loudspeaker comprising the steps of:

providing a base film having a thickness of about 25 μm or less;

soaking the base film in an aqueous solution of a conductive high molecular monomer, a chemical oxidizer and a dopant for a time sufficient to provide a conductive polymer layer having a thickness of from about 0.04% to about 5% of the base film thickness on the base film;

rinsing the conductive polymer layer and base film with water; and drying the conductive polymer layer and base film to provide said diaphragm, the conductive polymer layer having a surface resistivity of from about $1 \times 10^4$ to about $1 \times 10^{10}$ ohms per square.

* * * * *